United States Patent [19]
Kluzner et al.

[11] Patent Number: 5,974,786
[45] Date of Patent: Nov. 2, 1999

[54] ADAPTIVE TIME WINDOW TO SYNCHRONIZE PRE- AND POST-CATALYST OXYGEN SENSOR SWITCH COUNTERS

[75] Inventors: Michael I. Kluzner, Oak Park; Christopher Kirk Davey, Novi; David Robert Nader, Farmington Hills; Robert Joseph Jerger, Livonia, all of Mich.

[73] Assignee: Ford Global Technologies, Inc., Dearborn, Mich.

[21] Appl. No.: 08/786,597

[22] Filed: Jan. 21, 1997

[51] Int. Cl.⁶ .................................................. F01N 3/00
[52] U.S. Cl. .............................. 60/274; 60/277; 123/691; 701/109
[58] Field of Search .................... 60/274, 277; 73/118.1; 702/45, 50, 100; 123/691, 703; 701/102, 108, 109, 115

[56] References Cited

U.S. PATENT DOCUMENTS

| | | | |
|---|---|---|---|
| 5,077,970 | 1/1992 | Hamburg | 60/274 |
| 5,357,753 | 10/1994 | Wade | 60/274 |
| 5,365,216 | 11/1994 | Kotwicki et al. | 60/274 |
| 5,385,016 | 1/1995 | Zimlich et al. | 60/277 |
| 5,544,481 | 8/1996 | Davey et al. | 60/274 |
| 5,644,912 | 7/1997 | Kawamura | 60/276 |

FOREIGN PATENT DOCUMENTS

| | | |
|---|---|---|
| 03124909 | 5/1991 | Japan . |
| 05231136 | 9/1993 | Japan . |
| 05231137 | 9/1993 | Japan . |
| 05231138 | 9/1993 | Japan . |
| 05312026 | 11/1993 | Japan . |
| 06093845 | 4/1994 | Japan . |
| 06330741 | 11/1994 | Japan . |
| 07071234 | 3/1995 | Japan . |
| 07293233 | 11/1995 | Japan . |
| 07305644 | 11/1995 | Japan . |
| 07310534 | 11/1995 | Japan . |
| 08004522 | 1/1996 | Japan . |
| 08061052 | 3/1996 | Japan . |
| 08100639 | 4/1996 | Japan . |
| 08105318 | 4/1996 | Japan . |
| 08121147 | 5/1996 | Japan . |

*Primary Examiner*—Edward K. Look
*Assistant Examiner*—Binh Tran
*Attorney, Agent, or Firm*—Allan J. Lippa; Roger L. May

[57] ABSTRACT

A system and method for monitoring efficiency of a catalytic converter count switches of at least one upstream sensor interposed the engine and the converter and count switches of a downstream sensor, interposed the converter and atmosphere, during a definite time period after a switch of the at least one upstream sensor to account for propagation delay of exhaust gases traveling between the at least one upstream and downstream sensor. Upstream sensor switches may optionally be counted only if predetermined entry conditions are satisfied while downstream switches occurring during respective definite time periods after an upstream switch are counted without regard to the entry conditions. A switch ratio based on the number of switches of the at least one upstream sensor and switches of the downstream sensor is used to monitor conversion efficiency of the catalyst. The system and method may include selecting a current air flow range from a plurality of air flow ranges and associating sensor switches and/or switch ratios with corresponding air flow ranges to compensate for the propagation delay. In inferred sensor signal base on dual upstream sensors may be used to trigger the definite time periods and calculate the switch ratio(s).

16 Claims, 2 Drawing Sheets

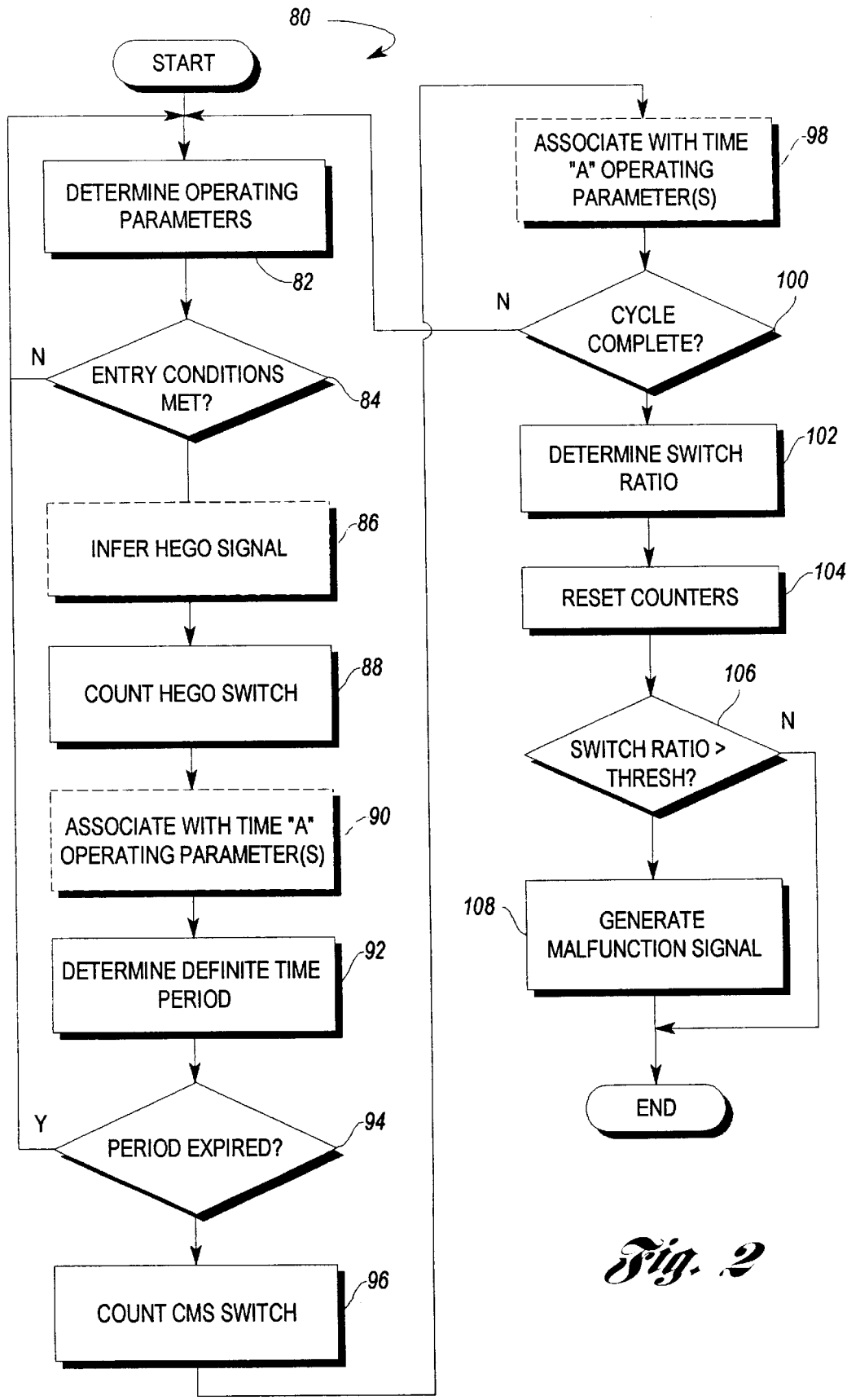

5,974,786

ADAPTIVE TIME WINDOW TO SYNCHRONIZE PRE- AND POST-CATALYST OXYGEN SENSOR SWITCH COUNTERS

TECHNICAL FIELD

The present invention relates to systems and methods for monitoring a catalytic converter based on a switch ratio of oxygen sensors positioned upstream and downstream of the catalytic converter.

BACKGROUND ART

The conversion efficiency of a catalytic converter may be monitored using a pre-catalyst oxygen sensor (HEGO sensor) positioned upstream from the catalytic converter and a post-catalyst oxygen sensor (catalyst monitor sensor or CMS) positioned downstream from the catalytic converter. One method known for monitoring converter efficiency is to calculate a ratio of CMS transitions or switches to HEGO transitions or switches. An increasing switch ratio is generally indicative of a degrading catalyst.

Catalytic conversion efficiency may vary greatly depending upon the particular operating conditions. To provide an accurate indication of conversion efficiency it is desirable to monitor performance under similar operating conditions over time. To reduce variation of the switch ratio due to factors other than converter degradation, a number of global and local entry conditions must be satisfied before a HEGO switch or a CMS switch is counted. Thus, any switch which occurs when the entry conditions are not met is not counted. To assure a statistically significant sample, a predetermined number of HEGO switches should be counted prior to determination of the switch ratio.

The prior art systems and methods for determining catalyst conversion efficiency based on a switch ratio do not account for the propagation delay or transit time for the exhaust gases to travel from the upstream sensor(s) to the downstream sensor. As such, downstream sensor switches which are attributable to exhaust gases created while entry conditions were satisfied may not be counted if entry conditions are no longer satisfied when the exhaust gases reach the downstream sensor. This affects the accuracy and variation of the switch ratio.

Due to packaging considerations, some engines require separate HEGO sensors for each cylinder bank even though the exhaust from both cylinder banks is combined prior to entering the catalytic converter. Prior art systems and methods may erroneously determine the switch ratio for a converter in these systems due to the cancellation effect of the combined cylinder bank exhausts.

DISCLOSURE OF THE INVENTION

It is thus a general object of the present invention to provide a method and system for monitoring the efficiency of a catalytic converter by synchronizing upstream and downstream exhaust sensors to account for propagation delay therebetween.

A further object of the present invention is to provide a system and method for monitoring a catalytic converter having increased. sensitivity and improved capability by more accurately counting upstream and downstream sensor switches.

In carrying out the above objects and other objects, features and advantages of the present invention, a method for monitoring efficiency of a catalytic converter in a vehicle having an internal combustion engine controlled by an engine controller and connected to the converter by an exhaust manifold from at least one engine cylinder bank is provided. The vehicle includes at least one upstream exhaust gas oxygen sensor disposed between the engine and the converter for providing voltage signals to the controller indicative of excursions from a stoichiometric combustion mixture and a downstream exhaust gas oxygen sensor interposed the converter and atmosphere for providing voltage signals to the controller indicative of conversion efficiency of the converter.

The method includes counting switches of the at least one upstream sensor, counting switches of the downstream sensor during a definite time period after a switch of the at least one upstream sensor, and calculating a switch ratio of downstream sensor switches to the at least one upstream sensor switches. A switch may be counted when the sensor voltage crosses a predetermined threshold or, alternatively, when the voltage varies by a predetermined amount within the adaptable time period.

In one embodiment, the method includes generating an inferred signal by combining voltage signals from a first upstream sensor coupled to a first exhaust manifold of a first cylinder bank and a second upstream sensor coupled to a second exhaust manifold of a second cylinder bank. The step of counting switches of the at least one upstream sensor includes counting switches of the inferred signal. An inferred signal switch occurs when the inferred signal crosses a switching threshold or alternatively when the inferred signal varies by a predetermined amount. The step of counting switches of the downstream sensor includes counting switches of the downstream sensor during a predetermined, adaptable time period after a switch of the inferred signal. The step of calculating a switch ratio includes calculating a switch ratio of downstream sensor switches to the inferred signal switches.

A system is also provided for monitoring efficiency of a catalytic converter coupled to an internal combustion engine. The system includes an upstream sensor interposed the engine and the converter for providing voltage signals indicative of excursions from a stoichiometric combustion mixture, a downstream sensor positioned downstream of the converter for providing voltage signals indicative of conversion efficiency of the converter, and a controller. The controller is in communication with the upstream sensor for counting switches of the upstream sensor, and in communication with the downstream sensor for counting switches of the downstream sensor during a predetermined adaptable time period after an upstream sensor switch. The controller is operable to calculate a switch ratio of downstream sensor switches to upstream sensor switches and to indicate converter efficiency based on the switch ratio.

In one embodiment, the system includes a first upstream sensor interposed a first cylinder bank and the converter for providing voltage signals indicative of excursions from a stoichiometric combustion mixture in a first exhaust manifold, a second upstream sensor interposed a second cylinder bank and the converter for providing voltage signals indicative of excursions from a stoichiometric combustion mixture in a second exhaust manifold, a downstream sensor positioned downstream of the converter for providing voltage signals indicative of conversion efficiency of the converter, and a controller.

The controller is in communication with the first and second upstream sensors to generate an inferred signal by combining voltage signals from the first and second upstream sensors and to count switches of the inferred signal. The controller is further in communication with the downstream sensor for counting switches of the downstream sensor during a predetermined adaptable time period after an inferred signal switch. The controller is operable to calculate a switch ratio of downstream sensor switches to inferred signal switches and to indicate converter efficiency in response to the switch ratio.

The advantages associated with the present invention are numerous. For example, the present invention accounts for the transport time required for exhaust gas passing through the converter to reduce switch ratio variation unrelated to catalyst efficiency. The present invention more accurately associates HEGO and CMS switches with corresponding mass air flow ranges. Furthermore, for engines having first and second upstream sensors, the present invention improves switch ratio determination by using an adaptive time window initiated by inferred signal switches to determine whether to count subsequent CMS switches. This reduces miscounting associated with the cancellation effect.

The above object and other objects, features, and advantages of the present invention, will be readily apparent from the following detailed description of the best mode for carrying out the invention when taken in connection with the accompanying drawings.

BRIEF DESCRIPTION OF THE DRAWINGS

FIG. 2 is a flow diagram representing operation of one embodiment of a system or method according to the present invention.

BEST MODE FOR CARRYING OUT THE PREFERRED EMBODIMENT

Figure 1:
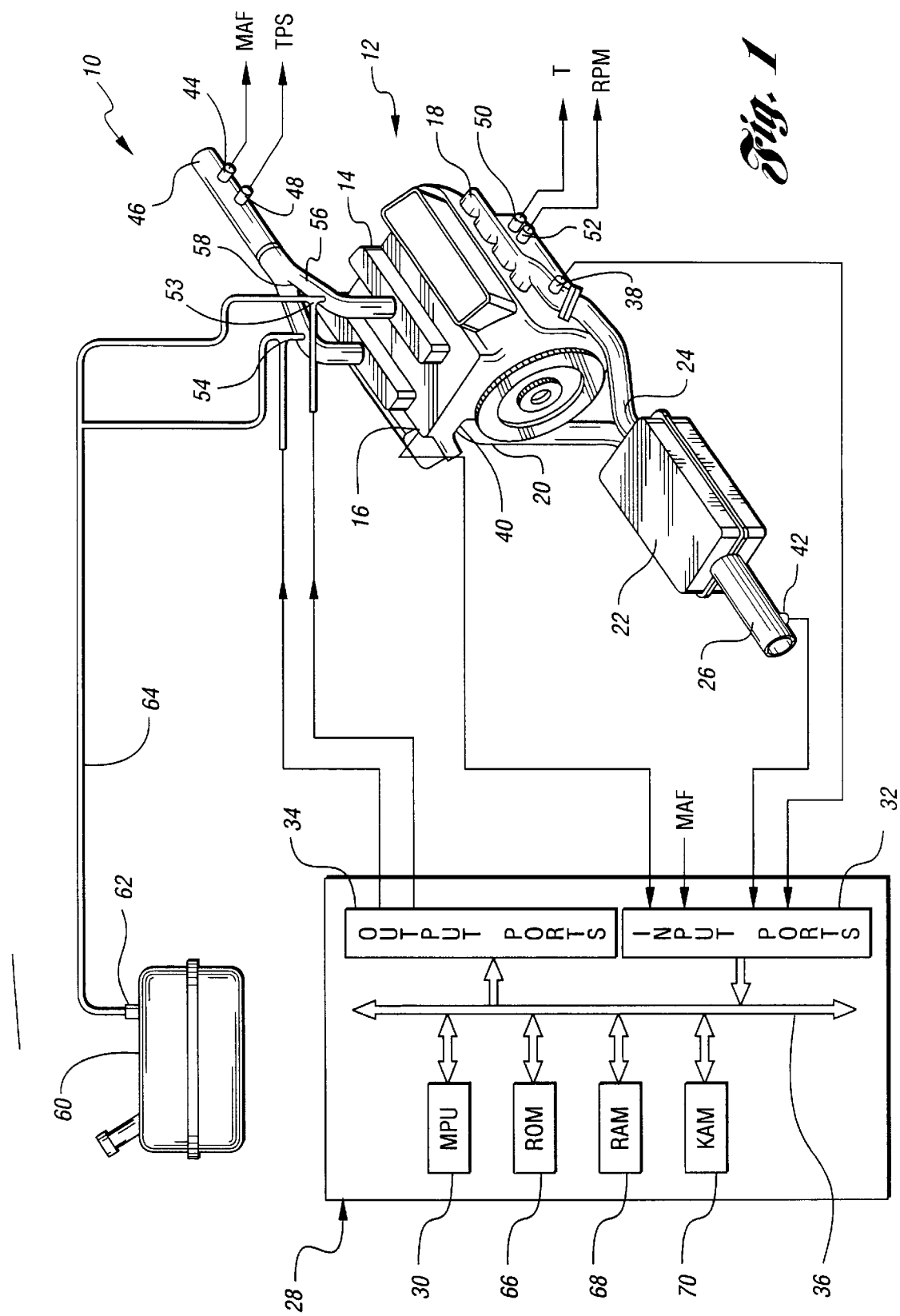
FIG. 1 is a block diagram of one embodiment of the present invention.

Referring now to FIG. 1, a block diagram is illustrating one embodiment of a system for monitoring efficiency of a catalytic converter is shown. System 10 includes an internal combustion engine 12 having intake manifolds 14 and 16 coupled to the right-hand and left-hand cylinder banks, respectively. Engine 12 also includes right-hand and left-hand exhaust manifolds 18 and 20 coupled to corresponding cylinder banks. A catalytic converter 22 is coupled to exhaust manifolds 18 and 20 by an upstream exhaust section 24. A downstream exhaust section 26 couples converter 22 to atmosphere.

An engine controller 28 includes microprocessor unit (MPU) 30, and various computer readable storage media, such as read only memory (ROM) 66, random access memory (RAM) 68, and keep-alive memory (KAM) 70. The computer readable storage media may be implemented by any of a number of known volatile and non-volatile storage devices including but not limited to PROM, EPROM, EEPROM, flash memory, and the like. RAM 68 is used for temporary data storage of various operating variables which are lost when the engine ignition is turned off, such as counters, timers, status flags, and the like. KAM 70 is generally used to store learned or adaptive values which may change over time. The contents of KAM 70 are maintained as long as some power is provided to controller 28. ROM 66 contains control logic implemented by program instructions executed by MPU 30 along with various system parameter values and calibrations. MPU 30, ROM 66, RAM 68, and KAM 70 are all in communication with engine 12 via input ports 32 and output ports 34. Data and control bus 36 provides communication between MPU 30, ROM 66, RAM 68, KAM 70, input ports 32, and output ports 34.

Controller 28 receives signals from various sensors which reflect current operating conditions of engine 12. A Heated Exhaust Gas Oxygen (HEGO) sensor 38 coupled to right-hand exhaust manifold 18 is used to detect the presence or absence of oxygen in exhaust manifold 18. HEGO sensor 38 provides a voltage signal to controller 28 via input port 32. The voltage signal is indicative of the excursion from the stoichiometric combustion mixture of the exhaust gases in exhaust manifold 18. Similarly, HEGO sensor 40, coupled to left-hand exhaust manifold 20, provides a voltage signal to controller 28 via input port 32 indicative of the excursion from the stoichiometric combustion mixture of the exhaust gases in exhaust manifold 20. In a "straight" pipe exhaust configuration, only one HEGO sensor is used and is positioned immediately upstream of the catalytic converter. The present invention applies to both the "Y" pipe configuration illustrated in FIG. 1 and the "straight" pipe configuration.

Preferably, the HEGO sensor signals are two-state signals having a predetermined high voltage when exhaust gases indicate a rich mixture and a predetermined low voltage when exhaust gases indicate a lean mixture. A catalyst monitor sensor (CMS) 42 monitors the presence or absence of oxygen in downstream exhaust section 26 and provides a voltage signal to controller 28 via input ports 32. CMS 42 is similar in operation to HEGO sensors 38 and 40.

Mass Air Flow (MAF) sensor 44 provides a signal indicating the mass air flow through intake 46 of engine 12 to controller 28 via input ports 32. Other sensors connected to controller 28 via input ports 32 may include a Throttle Position Sensor (TPS) 48, exhaust gas temperature sensor 50, and an engine speed sensor 52, among others.

Controller 28 uses control logic implemented in hardware and/or software to generate various signals to control and monitor operation of engine 12. For example, controller 28 generates an output signal to electronic fuel injectors 53 and 54 to control the quantity of fuel delivered to throttle bodies 56 and 58. Fuel is delivered to fuel injectors 53 and 54 by a conventional fuel system including a fuel tank 60, a fuel pump 62, and a fuel rail 64. Throttle bodies 56 and 58 are coupled to respective intake manifolds 14 and 16.

In operation, controller 28 may be used to monitor performance of catalytic converter 22 using HEGO sensors 38 and 40 and CMS 42. In one embodiment, controller 28 generates an inferred signal based on the voltage signals of HEGO sensors 38 and 40. Specifically, controller 28 uses signals from sensors 38 and 40 to reference a look-up table containing the inferred signal value. The inferred signal value represents the output from a hypothetical exhaust gas oxygen sensor exposed to a blended mixture of exhaust gases from right-hand and left-hand exhaust manifolds 18 and 20. The inferred signal is preferably determined as disclosed in U.S. Pat. No. 5,385,016, the disclosure of which is hereby incorporated by reference in its entirety.

For each completed monitor cycle, controller 28 calculates a switch ratio based on the number of counted downstream (CMS 42) switches and the number of counted upstream switches. In one embodiment, the switch ratio is calculated by dividing the number of counted downstream switches by the number of counted upstream switches. The calculated switch ratio is generally indicative of the efficiency of catalytic converter 22. Of course, other efficiency indicators may be determined based on the upstream and downstream sensor signals to monitor conversion efficiency of catalytic converter 22.

Preferably, a monitor cycle is complete after a calibratable number of upstream switches are counted to assure a statistically significant sample size. An upstream switch may be based directly on the HEGO signal for systems which have a single upstream sensor or on an inferred signal for systems having dual upstream sensors. A switch is preferably indicated when the signal varies by a predetermined amount or alternatively when the signal crosses a switching threshold. In one embodiment of the present these switching indications are combined such that a HEGO switch occurs when the HEGO signal crosses a switching threshold whereas a CMS switch occurs when the CMS signal varies by a predetermined amount over a particular time period.

To improve reliability and reduce variation, switches are preferably counted only as described in reference to FIG. 2. In one embodiment, an upstream switch is counted by controller 28 only if a number of global and local entry conditions are met. Entry conditions may be based on various engine operating parameters, some of which are monitored by one or more associated sensors, such as coolant temperature, catalyst temperature, vehicle speed, engine speed, and the like. Other operating parameters which may be used include elapsed time in closed loop control, elapsed time from engine start, throttle stability, and the like.

Controller 28 compensates for propagation delay of exhaust gases passing from upstream exhaust section 24 through converter 22 to downstream exhaust section 26 by counting downstream sensor switches which occur during a definite time period after corresponding upstream sensor switches. The upstream and/or downstream switches may be associated with engine operating conditions causally connected to the corresponding switches. For example, current engine operating conditions as determined by one or more sensors, such as MAF 44, TPS 46, RPM sensor 52, or temperature sensor 50, may be associated with an upstream sensor switch. Those same operating conditions may then be associated with the downstream sensor switch to account for the propagation delay of the exhaust gases through the system. Of course, the travel time or propagation delay from the various cylinders to the upstream sensor(s) may be accommodated in a similar fashion if desired. As such, the "current" operating conditions refer to those conditions causally related to the corresponding sensor switch and not necessarily those which are actually occurring at the time of the switch.

In one embodiment, controller 28 is operational to select a current air flow range from a plurality of air flow ranges based on a current engine air flow as indicated by MAF sensor 44. Controller 28 associates each CMS 42 switch with the current air flow range. Controller 28 may also associate a switch ratio with the current air flow range. Associating a switch ratio with each air flow range for catalytic converter 22 may be desirable for testing and development purposes. In production, the various switch ratios may each have corresponding threshold levels or a single threshold may apply to a linear or other combination of the switch ratios for each air flow range.

Referring now to FIG. 2, a flow diagram 80 generally illustrates operation of a system or method according to the present invention. As will be appreciated by one of ordinary skill in the art, the flow diagram represents control logic which may be implemented in hardware, software, or a combination of hardware and software. Preferably, the control logic is stored in a computer readable medium, such as a PROM, EPROM, EEPROM, or flash memory, and represents program instructions which may be executed by a microprocessor. Of course, other implementations of the control logic using discrete components and/or custom integrated circuits, such as ASICs, are possible without departing from the spirit or scope of the present invention. One of ordinary skill in the art will also recognize that the particular order or sequence illustrated is not necessarily required to achieve the goals and objects of the present invention. FIG. 2 shows sequential operation of a system or method for ease of illustration and description only. As such, various programming and processing strategies may be used, such as interrupt-driven processing, parallel processing, or the like, depending upon the particular implementation. Similarly, one of ordinary skill will recognize various equivalent implementations to accomplish the objects and advantages of the present invention.

Block 82 of FIG. 2 represents determining one or more operating parameters of the engine. Operating parameters may include various engine conditions which are sensed by corresponding sensors as well as conditions which may be inferred, calculated, or otherwise determined. For example, operating parameters may include the mass air flow, coolant temperature, elapsed time in closed loop control, elapsed time from engine start, and the like. Block 84 then determines whether the appropriate entry conditions have been met based on the engine operating parameters determined in block 82. Entry conditions may include both global entry conditions and local entry conditions as described above. The entry conditions are preferably periodically monitored during the subsequent functions or operations so that upstream sensor switches are not counted if the entry conditions are no longer satisfied.

As indicated by the broken line of block 86, an upstream (HEGO) signal may optionally be inferred for systems having dual upstream sensors as described above. This operation may be omitted or skipped for those systems which utilize a single upstream exhaust gas sensor. Block 88 represents monitoring of the upstream sensor to determine when a switch occurs. A switch occurs when the inferred or actual signal crosses a switching threshold. Alternatively, a switch may be counted when the actual or inferred signal changes by a certain amount within a certain time period.

Block 90 represents associating the HEGO switch with engine operating parameters occurring at time "A". As indicated by the broken line, this is an optional step. In one embodiment of the present invention, the upstream sensor switches are associated with one of a plurality of predefined air flow ranges based on the "current" air flow indicated by the appropriate sensor. A definite time period is determined as indicated by block 92. This time period may be a predetermined time period or a variable time period based on the period between previously occurring adjacent HEGO switches. Each definite time period is initiated when a HEGO switch is detected. Block 94 determines whether the definite time period, or window, has expired. If the period has expired, control returns to block 82. Expiration of the definite period is preferably checked periodically throughout the remaining functions or operations. Multiple periods or windows may be simultaneously opened depending upon the length of each period and the time between the associated HEGO switch.

Block 96 of FIG. 2 monitors the downstream (CMS) sensor and counts corresponding switches. A switch is determined in a fashion similar to that described for the upstream sensor. A downstream sensor switch is counted provided it occurs during the definite time period without regard to the entry conditions being satisfied. The CMS switch is optionally associated with the engine operating parameters occurring at time "A" as indicated by block 98 even though some time has elapsed from the occurrence of the HEGO switch. As such, the system or method compensates for the propagation delay of the exhaust gases responsible for a HEGO switch and an associated CMS switch. Block 100 determines whether a monitor cycle or trip has been completed. Preferably, a cycle is complete when a predetermined number of HEGO switches has been observed for each of a plurality of predetermined air flow ranges. If the cycle is not complete, the system and method continue to monitor the operating parameters and observe HEGO and CMS switches.

For completed cycles, a switch ratio is determined as indicated by block 102. The switch ratio is preferably based on the number of counted downstream switches and the number of counted upstream switches. If desired, a switch ratio may be associated with one or more engine operating conditions. For example, a switch ratio may be associated with each of a plurality of air flow ranges. After the switch ratio has been determined, block 104 resets the upstream and downstream sensor counters.

Block 106 of FIG. 2 represents determining whether the switch ratio exceeds a corresponding threshold. If multiple switch ratios are utilized, each may have a corresponding threshold. Alternatively, a single threshold may be used based on a combination of the multiple switch ratios. If the threshold is exceeded, block 108 generates a malfunction signal based on the result of block 106 to alert the vehicle operator.

As such, the present invention synchronizes switches associated with upstream and downstream exhaust gas sensors to account for propagation delay therebetween. The resulting catalyst monitor has increased sensitivity and improved capability to more accurately monitor conversion efficiency, especially under changing engine operating conditions.

While the best mode for carrying out the invention has been described in detail, those familiar with the art to which this invention relates will recognize various alternative designs and embodiments for practicing the invention as defined by the following claims.

What is claimed is:

1. A method for monitoring a catalytic converter operatively associated with an exhaust stream having at least one upstream exhaust gas sensor and a downstream exhaust gas sensor, the method comprising:

counting a switch of the at least one upstream exhaust gas sensor; and counting a switch of the downstream exhaust gas sensor corresponding to a switch of the at least one upstream exhaust gas sensor only if the switch of the downstream sensor occurs within a definite time period after a switch of the at least one upstream exhaust gas sensor to account for propagation delay between the at least one upstream exhaust gas sensor and the downstream exhaust gas sensor.

2. The method of claim 1 further comprising:

calculating a switch ratio based on downstream sensor switches and upstream sensor switches to indicate converter efficiency.

3. The method of claim 1 further comprising:

selecting an upstream sensor air flow range from a plurality of air flow ranges based on air flow during the switch of the at least one upstream exhaust gas sensor;

associating the switch of the at least one upstream exhaust gas sensor with the upstream sensor air flow range; and associating the switch of the downstream exhaust gas sensor with the upstream sensor air flow range without regard to airflow during the switch of the downstream exhaust gas sensor.

4. The method of claim 2 wherein the step of calculating a switch ratio comprises associating the switch ratio with the upstream sensor air flow range.

5. The method of claim 1 further comprising:

selecting an upstream sensor air flow range based on air flow during the switch of the at least one upstream exhaust gas sensor;

associating the switch of the at least one upstream sensor with the upstream sensor air flow range without regard to current airflow;

calculating a switch ratio based on switches counted for the upstream and downstream sensors after predetermined numbers of counted upstream sensor switches have been associated with each of the plurality of predetermined air flow ranges.

6. The method of claim 1 wherein the definite time period varies based on a period of time between consecutive switches of the at least one upstream exhaust gas sensor.

7. The method of claim 1 wherein the at least one upstream exhaust gas sensor includes first and second upstream exhaust gas sensors, the method further comprising:

generating an inferred upstream exhaust gas signal based on signals generated by the first and second exhaust gas sensors; and wherein the step of counting switches of the at least one upstream exhaust gas sensor comprises counting switches of the inferred upstream exhaust gas signal and wherein the step of counting switches of the downstream exhaust gas sensor comprises counting switches of the downstream exhaust gas sensor which occur during a definite time period after a switch of the inferred exhaust gas signal.

8. The method of claim 7 further comprising calculating a switch ratio based on counted downstream sensor switches and counted switches of the inferred exhaust gas signal.

9. The method of claim 1 further comprising:

determining whether at least one entry condition is satisfied;

wherein the step of counting the switch of the at least one upstream exhaust gas sensor is performed only if the at least one entry condition is satisfied; and wherein the step of counting the switch of the downstream exhaust sensor during the definite time period is performed regardless of whether the at least one entry condition is satisfied.

10. A system for monitoring efficiency of a catalytic converter coupled to an internal combustion engine, the system comprising:

an upstream sensor interposed the engine and the catalytic converter for providing signals indicative of excursions from a stoichiometric combustion mixture;

a downstream sensor interposed the catalytic converter and atmosphere for providing signals indicative of conversion efficiency of the catalytic converter; and a controller in communication with the upstream and downstream sensors for counting switches of the upstream sensor and for counting only those switches of the downstream sensor which occur during definite respective time periods after corresponding switches of the upstream sensor to account for propagation delay of gases between the upstream sensor and the downstream sensor.

11. The system of claim 10 further comprising:

an air flow sensor in communication with the controller for determining a current air flow;

wherein the controller selects an upstream sensor air flow range from a plurality of air flow ranges based on the current air flow corresponding to the upstream sensor switch, and associates a downstream sensor switch occurring during the respective definite time period with the upstream sensor air flow range.

12. The system of claim 10 further comprising:

at least one sensor in communication with the controller for sensing an operating condition of the internal combustion engine;

wherein the controller determines whether at least one entry condition for monitoring the catalytic converter is satisfied based on the at least one sensor, counts switches of the upstream sensor only if the at least one entry condition is satisfied, and counts downstream switches occurring during the respective definite time periods regardless of whether the at least one entry condition is satisfied.

13. An article of manufacture comprising:

a computer storage medium having a computer program encoded therein for causing a computer to monitor performance of a catalytic convertor associated with at least one upstream exhaust gas sensor and a downstream exhaust gas sensor, said computer storage medium comprising:

control logic for causing a computer to count a switch of the at least one upstream exhaust gas sensor; and control logic for causing a computer to count a switch of the downstream exhaust gas sensor corresponding to a switch of the at least one upstream exhaust gas sensor only if the switch of the downstream sensor occurs within a definite time period after a switch of the at least one upstream sensor to account for propagation delay between the at least one upstream exhaust gas sensor and the downstream exhaust gas sensor.

14. The article of manufacture of claim 13 wherein said computer storage medium further comprises:

control logic for causing a computer to select an upstream sensor air flow range from a plurality of air flow ranges based on air flow during the switch of the at least one upstream exhaust gas sensor; and control logic for causing a computer to associate the switch of the downstream exhaust gas sensor with the upstream sensor air flow range.

15. The article of manufacture of claim 13 wherein said computer storage medium further comprises:

control logic for causing a computer to determine whether at least one entry condition is satisfied;

control logic for causing a computer to count switches of the at least one upstream exhaust gas sensor only if the at least one entry condition is satisfied; and control logic for causing a computer to count switches of the downstream exhaust gas sensor occurring during respective definite time periods regardless of whether the at least one entry condition is satisfied.

16. A method for monitoring a catalytic converter operatively associated with an exhaust stream having at least one upstream exhaust gas sensor and a downstream exhaust gas sensor, the method comprising:

counting a switch of the at least one upstream exhaust gas sensor; and accounting for propagation delay between the at least one upstream exhaust gas sensor and the downstream exhaust gas sensor in determining whether to count a switch of the downstream exhaust gas sensor.

* * * * *